United States Patent [19]

Kuroda et al.

[11] Patent Number: 5,449,747
[45] Date of Patent: Sep. 12, 1995

[54] METHOD FOR PRODUCING A VINYL CHLORIDE RESIN

[75] Inventors: Sadaki Kuroda; Hideo Aritake, both of Yokkaichi; Tokio Niikuni, Suzuka, all of Japan

[73] Assignee: Mitsubishi Chemical Corporation, Tokyo, Japan

[21] Appl. No.: 145,241

[22] Filed: Nov. 3, 1993

[30] Foreign Application Priority Data

Nov. 4, 1992 [JP] Japan ................................. 4-295121

[51] Int. Cl.⁶ ................................................ C08F 6/10
[52] U.S. Cl. .................................... 528/501; 528/500; 528/502 E
[58] Field of Search .......................... 528/502, 501, 500

[56] References Cited

U.S. PATENT DOCUMENTS

| | | | |
|---|---|---|---|
| 3,320,220 | 5/1967 | Di Drusco et al. | 528/502 |
| 3,883,494 | 5/1975 | Winter et al. | 260/92.8 |
| 3,993,857 | 11/1976 | Smolinski et al. | 528/502 |
| 4,334,057 | 6/1982 | Govoni et al. | 528/500 |
| 4,375,541 | 3/1983 | Wei et al. | 528/500 |
| 4,424,340 | 1/1984 | Golstein et al. | 528/500 |
| 4,483,747 | 11/1984 | Aruga et al. | 528/500 |

FOREIGN PATENT DOCUMENTS

| | | |
|---|---|---|
| 0261014 | 3/1988 | European Pat. Off. |
| 442569 | 8/1991 | European Pat. Off. |
| 0442569 | 8/1991 | European Pat. Off. |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A method for producing a vinyl chloride resin, which comprises spray drying a vinyl chloride polymer latex by means of a double fluid nozzle, wherein steam or a gas mixture of steam and an inert gas is used as spray gas.

20 Claims, No Drawings

METHOD FOR PRODUCING A VINYL CHLORIDE RESIN

The present invention relates to a method for producing a vinyl chloride resin with a low content of particles having a particle size of more than 40 μm, by spray drying.

Heretofore, it has been common to employ a method of spray drying a vinyl chloride polymer latex by means of a rotary disc, a single fluid nozzle or a double fluid nozzle to produce a vinyl chloride resin useful as a paste-making resin. The method of spray drying by means of a double fluid nozzle to obtain a paste-making resin is disclosed, for example, in Japanese Unexamined Patent Publication No. 41951/1979 or No. 67341/1973. However, in the method disclosed in such a publication, air is used as the spray gas, and it has been common that the particle size of the obtained vinyl chloride resin is large. When a paste-making vinyl chloride resin containing particles with a large particle size exceeding 40 μm (hereinafter referred to as "coarse particles") is used for preparation of a plastisol, the dispersing rate of such particles into a plasticizer is low, and in many cases, it takes time for formation of a sol. Further, a part of coarse particles tend to remain in the sol without being dispersed, and it is likely that they impair the foaming property during the processing, delay the thermal fusion, or form hard spots or irregularities on the surface of a product particularly when used for a spread coating method.

If the dried particles are pulverized or sieved to prevent such drawbacks, the content of fine powder with a particle size of e.g. less than 1 μm in the vinyl chloride resin increases, whereby the powder flowability tends to be poor, and the automatic measurement of the amount tends to be difficult. Further, such fine powder is susceptible to dusting and is not desirable also from the viewpoint of the working environment.

It is possible to reduce the particle size of a vinyl chloride resin spray dried by means of double fluid nozzles also by increasing the mass ratio of the spray air to the vinyl chloride polymer latex. However, such a method has a drawback that a large scale air compressing apparatus has to be installed and that larger energy is consumed. It is also conceivable to spray dry a latex with reduced solid content. However, this method requires a large heat quantity corresponding to the amount of water which has to be evaporated. These methods are thus economically disadvantageous.

Japanese Unexamined Patent Publication No. 226025/1984 discloses a method for producing spherical particles from a melt of e.g. a polyolefin by means of a double fluid nozzle having a specific structure and describes that steam may be used as the spray gas. However, this publication does not teach a technical concept of drying, more particularly, a technical concept such that a vinyl chloride polymer latex is sprayed in the form of fine liquid droplets and dried to obtain fine dried particles.

The present inventors have conducted extensive researches for a method for producing a vinyl chloride resin which contains no substantial amount of particles with a particle size of more than 40 μm and which is capable of being directly mixed with a plasticizer without pulverization or sieving to obtain a plastisol having excellent dispersion stability and as a result, have found it possible to accomplish such an object by using steam or a gas mixture of steam and an inert gas as spray gas at the time of spray drying by means of a double fluid nozzle. The present invention has been accomplished on the basis of this discovery.

Namely, the object of the present invention is to provide a method for producing a vinyl chloride resin containing no substantial amount of particles with a particle size of more than 40 μm by spray drying a vinyl chloride polymer latex.

The present invention provides a method for producing a vinyl chloride resin, which comprises spray drying a vinyl chloride polymer latex by means of a double fluid nozzle, wherein steam or a gas mixture of steam and an inert gas is used as spray gas.

Now, the method of the present invention will be described in detail with reference to the preferred embodiments.

The vinyl chloride polymer latex to be used for the method of the present invention, may be prepared, for example, by a method wherein vinyl chloride or a mixture of vinyl chloride and a comonomer copolymerizable therewith, is emulsion-polymerized in an aqueous medium in the presence of an emulsifier and a water-soluble polymerization initiator, or by a method wherein such a monomer or a monomer mixture is subjected to microsuspension polymerization in the presence of an emulsifier and an oil-soluble polymerization initiator.

The solid content concentration in the vinyl chloride polymer latex is not particularly limited, but it is usually from 20 to 80% by weight, preferably from 40 to 65% by weight, and the viscosity is usually not higher than 0.1 Pa.sec.

The comonomer copolymerizable with vinyl chloride may, for example, be a vinyl-halide monomer such as vinylidene chloride, a vinyl ester such as vinyl acetate, vinyl propionate or vinyl stearate, a monobasic unsaturated acid such as acrylic acid, methacrylic acid or itaconic acid, an alkyl ester of such a monobasic unsaturated acid, a vinyl ether such as methyl vinyl ether, ethyl vinyl ether, octyl vinyl ether or lauryl vinyl ether, a bivalent unsaturated acid such as maleic acid or fumaric acid, an acid anhydride of such a dibasic unsaturated acid, an alkyl ester of such a dibasic unsaturated acid, or an unsaturated nitrile. Two or more of such comonomers may be copolymerized.

The polymerization initiator to be used for the production of a vinyl chloride polymer latex, may, for example, be a persulfate (such as a sodium salt, a potassium salt or an ammonium salt), a water-soluble peroxide such as hydrogen peroxide, or a water-soluble redox initiator comprising such a persulfate or peroxide and a reducing agent (such as sodium sulfite, sodium pyrosulfite, ammonium sulfite, sodium hydrogensulfite, ascorbic acid or sodium formaldehyde sulfoxylate), a monomer-soluble (oil-soluble) initiator such as azobisisobutyronitrile, azobis-2,4-dimethylvaleronitrile, lauroyl peroxide or t-butylperoxy pivalate, or a initiator composed of a combination of such an oil-soluble initiator with a reducing agent similar to the reducing agent for the above-mentioned redox initiator.

The emulsifier to be used for the production of the latex, may, for example, be a higher alcohol sulfuric acid ester salt (such as an alkali metal salt or an ammonium salt), an alkylbenzene sulfonate (such as an alkali metal salt or an ammonium salt), a higher fatty acid salt (such as an alkali metal salt or an ammonium salt), other anionic surfactants, nonionic surfactants or cationic surfactants. These surfactants may be used alone or in combination as a mixture of two or more. Particularly preferred is an anionic surfactant. In addition, anionic and/or nonionic surfactants can be mixed during or after a latex is obtained.

Further, an agent for controlling the degree of polymerization or other additives may be used for the production of the vinyl chloride polymer latex. The agent for controlling the degree of polymerization may, for example, be a chain transfer agent such as trichloroethylene, carbon tetrachloride, 2-mercaptoethanol or octyl mercaptan, or a crosslinking agent such as diallyl phthalate, triallyl isocyanurate, ethylene glycol diacrylate or trimethylolpropane trimethacrylate.

As other additives, a water-soluble transition metal salt such as cupric chloride, ferrous sulfate or nickel nitrate, and a pH controlling agent such as an alkali metal monohydrogen or dihydrogen phosphate, potassium hydrogen phthalate or sodium hydrogencarbonate, may, for example, be mentioned.

The double fluid nozzle to be used in the method of the present invention, is provided in the interior of a drying apparatus, and its structure may be of an internal mixing type or of an external mixing type. A plurality of double fluid nozzles may be provided in the drying apparatus. In the method of the present invention, steam or a gas mixture comprising steam and an inert gas, is used as spray gas at the time of spray drying the vinyl chloride polymer latex. The temperature of the spray gas is not particularly limited, but it is usually within a range of from 25° to 300° C., preferably from 40° to 250° C., more preferably from 50° to 100° C. The inert gas to be used here may, for example, be air, nitrogen or neon. However, air is most suitable for the purpose of the present invention, since it is readily available.

If the spray gas has a high temperature, the latex may be heated by the spray gas depending upon the shapes of supply pipes for supplying the spray gas and the latex, whereby the stability of the latex is likely to be impaired, or the latex supply tube is likely to be clogged due to coagulation of the latex. Therefore, depending upon the shapes of the supply tubes, it is necessary to control the temperature of the supply gas, so that the temperature of the latex will not be too high.

The temperature of steam is determined depending upon the desired temperature of the spray gas or depending upon the mixing ratio of air, but it is usually within a range of from 110° to 300° C., preferably from 140° to 250° C.

When the gas mixture is used as the spray gas, the proportion of steam in the gas mixture is usually at least 2% by weight, preferably at least 5% by weight, more preferably at least 10% by weight, in the spray gas. If the amount is less than 2% by weight, formation of coarse particles tend to increase.

The temperature of the inert gas to be mixed may be ambient. However, in order to avoid the fluctuation of the spray gas temperature, it is usually preferred to heat it to a predetermined temperature by passing it through a heat exchanger, before it is mixed with steam. If the temperature of the inert gas is too low, the action to condense the steam is so high that the efficiency deteriorates. On the other hand, if it is attempted to use an inert gas at a high temperature exceeding 100° C., the cost for heating the inert gas increases, such being uneconomical. Water drops formed by condensation during the mixing is preferably removed by e.g. a drain separator. According to the method of the present invention, the particle size of the vinyl chloride resin can be controlled by adjusting the proportion of the spray gas to the latex or by adjusting the mixing ratio of steam and the inert gas. The mixing of the steam and the inert gas to obtain spray gas may be carried out either by blowing the inert gas to the stream of steam or by blowing the steam into the stream of the inert gas in the spray gas pipeline, so long as they form a gas mixture at the forward end of the double fluid nozzle where the spray gas is in contact with the vinyl chloride polymer latex.

The weight ratio of the spray gas to the latex is usually within a range of from 0.5 to 5, preferably from 1.5 to 3. If the weight ratio is less than 0.5, it tends to be difficult to reduce coarse particles. On the other hand, if it exceeds 5, the cost tends to be high and uneconomical, although such being effective for the purpose of reducing coarse particles.

When the gas mixture is used as spray gas, the larger the proportion of steam, the less the formation of coarse particles. Accordingly, in a case where a vinyl chloride resin having the same low content of coarse particles is to be produced, by using a gas mixture having a large proportion of steam, the weight ratio of the spray gas to the latex can be made small as compared with the case where the inert gas is used alone or a gas mixture having a small proportion of steam is used, whereby consumption of the spray gas can be minimized, which is industrially advantageous.

The temperature of drying air in the drying apparatus varies depending upon the supply amount i.e. the spray amount of the latex. However, it is usually preferred to adjust the temperature of the drying air at the inlet of the drying apparatus within a range of from 50° to 300° C., preferably from 120° to 200° C., and the temperature at the outlet of the drying apparatus within a range of from 25° to 90° C., preferably from 40° to 80° C. If the temperature at the outlet of the drying apparatus is lower than 25° C., drying of the vinyl chloride resin tends to be incomplete, or it tends to be difficult to maintain the temperature at a constant level. On the other hand, if the temperature at the outlet exceeds 90° C., the temperature of the resin particles is likely to exceed the glass transition point of the vinyl chloride resin, whereby if the dried particles collide with one another, they tend to unify to form coarse particles, and they tend to be hardly dispersed in a plasticizer, whereby it becomes difficult to obtain a satisfactory plastisol. Further, the amount of the latex to be supplied, will have to be reduced, whereby the productivity will be low.

Now, the method of the present invention will be described in further detail with reference to Examples. However, it should be understood that the present invention is by no means restricted to such specific Examples.

EXAMPLES 1 to 14 and COMPARATIVE EXAMPLES 1 to 11

(1) Preparation of vinyl chloride polymer latexes

Latexes were prepared by seeded emulsion polymerization and microsuspension polymerization per se known.

Latex A: Seeded emulsion-polymerization using sodium lauryl sulfate as the main emulsifier; Solid content concentration: 45% by weight; average particle size: 1.1 $\mu$m Latex B: Microsuspension polymerization using sodium lauryl sulfate as the main emulsifier; Solid content concentration: 38% by weight; average particle size: 0.8 μm Latex C: Seeded emulsion polymerization using sodium dodecylbenzene sulfonate as the main emulsifier; A solid content concentration of 40% by weight was concentrated to 55% by weight by means of an ultrafiltration filter; average particle size: 1.0 μm (2) Spray drying the latexes A latex obtained in the above step (1) was supplied to ten double fluid nozzles disposed at equal distances on the same circumference in a spray dry apparatus having an internal capacity of 150 m³ so that they were located at the same distance from the inner wall of the apparatus, at a flow rate of from about 65 to 75 kg/hr.nozzle, and the drying operation was carried out with the composition of the spray gas under the conditions of the drying air temperature and the spray gas/latex weight ratio as identified in Tables 1 to 3.

The proportion of particles exceeding 40 μm in the obtained vinyl chloride resin was measured by a particle size measuring method as identified in the following item (3) The results are also shown in Tables 1 to 3.

(3) Particle size measuring method

A flow cell holder was set in a laser diffraction type particle size distribution measuring apparatus (LA-500, manufactured by HORIBA, LTD.), and about 200 ml of a 0.1% polyoxyethylene sorbitan monolaurate aqueous solution was put into a bath as a dispersing medium and permitted to circulate under stirring. A blank of a diffraction image was measured, and then a small amount of the vinyl chloride resin obtained in the above step (2) was added to the bath and dispersed for 30 seconds, whereupon the particle size distribution of the sample was measured. From the particle size distribution, the proportion (% by weight) of particles having large particle sizes exceeding 40 μm was determined.

TABLE 1

|  | Examples | | | | | | Comparative Examples | | |
| --- | --- | --- | --- | --- | --- | --- | --- | --- | --- |
|  | 1 | 2 | 3 | 4 | 5 | 6 | 1 | 2 | 3 |
| Spray gas | | | | | | | | | |
| Ratio of air/steam (wt %) | 0/100 | 50/50 | 80/20 | 90/10 | 95/5 | 98/2 | 100/0 | 100/0 | 100/0 |
| Temperature of air (°C.) | — | 30 | 30 | 30 | 30 | 30 | 30 | 80 | 120 |
| Temperature of steam (°C.) | 250 | 250 | 250 | 250 | 250 | 250 | — | — | — |
| Temperature of spray gas (°C.) | 248 | 172 | 99 | 67 | 49 | 38 | 30 | 80 | 120 |
| Drying air | | | | | | | | | |
| Inlet temperature (°C.) | 160 | 160 | 160 | 160 | 160 | 160 | 160 | 160 | 160 |
| Outlet temperature (°C.) | 50 | 50 | 50 | 50 | 50 | 50 | 50 | 50 | 50 |
| Weight ratio of spray gas/latex | 1.0 | 1.0 | 1.0 | 1.0 | 1.0 | 1.0 | 1.0 | 1.0 | 1.0 |
| Latex used | A | A | A | A | A | A | A | A | A |
| Weight ratio of particles of >40 μm (%) | 0 | 0 | 0.2 | 1.3 | 4.5 | 5.0 | 5.7 | 5.8 | 5.5 |

TABLE 2

|  | Examples | | | | Comparative Examples | | | |
| --- | --- | --- | --- | --- | --- | --- | --- | --- |
|  | 7 | 8 | 9 | 10 | 4 | 5 | 6 | 7 |
| Spray gas | | | | | | | | |
| Ratio of air/steam (wt %) | 50/50 | 95/5 | 50/50 | 95/5 | 100/0 | 100/0 | 100/0 | 100/0 |
| Temperature of air (°C.) | 30 | 30 | 30 | 30 | 30 | 80 | 30 | 80 |
| Temperature of steam (°C.) | 250 | 250 | 250 | 250 | — | — | — | — |
| Temperature of spray gas (°C.) | 174 | 47 | 173 | 49 | 30 | 80 | 30 | 80 |
| Drying air | | | | | | | | |
| Inlet temperature (°C.) | 160 | 160 | 160 | 160 | 160 | 160 | 160 | 160 |
| Outlet temperature (°C.) | 50 | 50 | 50 | 50 | 50 | 50 | 50 | 50 |
| Weight ratio of spray gas/latex | 0.5 | 0.5 | 3.0 | 3.0 | 0.5 | 0.5 | 3.0 | 3.0 |
| Latex used | A | A | A | A | A | A | A | A |
| Weight ratio of particies of >40 μm (%) | 0.5 | 4.7 | 0 | 0 | 15.2 | 15.1 | 5.5 | 5.3 |

TABLE 3

|  | Examples | | | | Comparative Examples | | | |
| --- | --- | --- | --- | --- | --- | --- | --- | --- |
|  | 11 | 12 | 13 | 14 | 8 | 9 | 10 | 11 |
| Spray gas | | | | | | | | |
| Ratio of air/stea (wt %) | 50/50 | 50/50 | 50/50 | 50/50 | 100/0 | 100/0 | 100/0 | 100/0 |
| Temperature of air (°C.) | 30 | 30 | 30 | 30 | 30 | 30 | 30 | 30 |
| Temperature of steam (°C.) | 250 | 250 | 250 | 250 | — | — | — | — |
| Temperature of spray gas (°C.) | 173 | 175 | 173 | 174 | 30 | 30 | 30 | 30 |
| Drying air | | | | | | | | |
| Inlet temperature (°C.) | 160 | 160 | 160 | 160 | 160 | 160 | 160 | 160 |
| Outlet temperature (°C.) | 50 | 50 | 65 | 70 | 50 | 50 | 65 | 70 |
| Weight ratio of spray gas/latex | 1.0 | 1.0 | 1.0 | 1.0 | 1.0 | 1.0 | 1.0 | 1.0 |
| Latex used | B | C | A | A | B | C | A | A |
| Weight ratio of particles of >40 μm (%) | 0 | 0 | 0 | 0 | 5.4 | 6.4 | 5.8 | 5.7 |

As is apparent from the results of the above Examples and Comparative Examples, particles having large particle sizes exceeding 40 μm can be remarkably reduced when steam or a gas mixture of steam and an inert gas, is used as the spray gas.

According to the method of the present invention, steam or a gas mixture of steam and an inert gas, is used as spray gas at the time of drying a vinyl chloride polymer latex by means of a double fluid nozzle, whereby formation of coarse particles can be remarkably reduced, and steps of pulverization, sieving, etc. can be omitted or down-sized. Further, the amount of coarse particles can be reduced by increasing the proportion of steam in the spray gas. Accordingly, when a vinyl chloride resin with an equally small content of coarse particles is to be produced, by using a gas mixture having a large proportion of steam, the weight ratio of the spray gas to the latex can be made small as compared with spray drying with an inert gas alone or with a gas mixture having a small proportion of steam. Accordingly, consumption of the spray gas can be reduced, and consumption of electric energy required for compressing the inert gas can be reduced.

The vinyl chloride resin produced by the method of the present invention can simply and directly be mixed with a plasticizer to readily obtain a plastisol.

What is claimed is:

1. A method for producing a vinyl chloride resin, which comprises spray drying a vinyl chloride polymer latex by means of a double fluid nozzle, wherein steam or a gas mixture of steam and an inert gas is used as spray gas.

2. The method according to claim 1, wherein the temperature of the spray gas is within a range of from 25° to 300° C.

3. The method according to claim 1, wherein the proportion of steam in the spray gas is at least 2% by weight.

4. The method according to claim 2, wherein the proportion of steam in the spray gas is at least 2% by weight.

5. The method according to claim 1, wherein the weight ratio of the spray gas to the vinyl chloride polymer latex is within a range of from 0.5 to 5.

6. The method according to claim 2, wherein the weight ratio of the spray gas to the vinyl chloride polymer latex is within a range of from 0.5 to 5.

7. The method according to claim 3, wherein the weight ratio of the spray gas to the vinyl chloride polymer latex is within a range of from 0.5 to 5.

8. The method according to claim 4, wherein the weight ratio of the spray gas to the vinyl chloride polymer latex is within a range of from 0.5 to 5.

9. The method according to claim 1, wherein air is used as the inert gas.

10. The method according to claim 2, wherein air is used as the inert gas.

11. The method according to claim 3, wherein air is used as the inert gas.

12. The method according to claim 4, wherein air is used as the inert gas.

13. The method according to claim 5, wherein air is used as the inert gas.

14. The method according to claim 6, wherein air is used as the inert gas.

15. The method according to claim 7, wherein air is used as the inert gas.

16. The method according to claim 8, wherein air is used as the inert gas.

17. The method according to claim 1, wherein the temperature of drying air at a drying air outlet of the spray drying apparatus is within a range of from 25° to 90° C.

18. The method according to claim 2, wherein the temperature of drying air at a drying air outlet of the spray drying apparatus is within a range of from 25° to 90° C.

19. The method according to claim 3, wherein the temperature of drying air at a drying air outlet of the spray drying apparatus is within a range of from 25° to 90° C.

20. A method of producing a particulate vinyl chloride resin, which contains not more than 5% by weight of particles having a size in excess of 40 $\mu$m, which comprises:

spray drying a vinyl chloride polymer latex through an internal mixing or external mixing double fluid nozzle which employs a spray gas of steam or a mixture of steam and an inert gas.

* * * * *